(12) United States Patent
Sommer et al.

(10) Patent No.: US 6,281,338 B1
(45) Date of Patent: Aug. 28, 2001

(54) MONO- AND DIPOTASSIUM SALTS OF AZO COMPOUNDS

(75) Inventors: Richard Sommer, Odenthal; Frank Linke, Köln; Udo Herrmann, Dormagen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/665,506

(22) Filed: Sep. 19, 2000

(30) Foreign Application Priority Data

Sep. 21, 1999 (DE) .............................. 199 45 245

(51) Int. Cl.[7] .................... C09B 29/036; C09B 29/52; C09B 45/14; C09B 45/22
(52) U.S. Cl. ................. 534/581; 534/602; 534/707; 534/737; 534/767; 8/685; 8/919; 106/480; 106/496; 524/190
(58) Field of Search .................. 534/737, 767, 534/707, 581, 602; 8/685, 919; 106/480, 496; 524/190

(56) References Cited

U.S. PATENT DOCUMENTS

| 3,869,439 | 3/1975 | Schundehutte | 260/146 D |
|---|---|---|---|
| 4,622,391 | 11/1986 | Lorenz et al. | 534/707 |
| 4,628,082 | 12/1986 | Lorenz et al. | 534/707 |
| 4,942,225 | 7/1990 | Lorenz | 534/560 |

FOREIGN PATENT DOCUMENTS 093306   11/1983   (EP) .

OTHER PUBLICATIONS

Angewandte Chemie, 79, (month unavailable) 1967, pp. 786–801, Von M. Regitz et al Diazogruppen–Übertragung.

*Primary Examiner*—Fiona T. Powers
(74) *Attorney, Agent, or Firm*—Joseph C. Gil; Richard E. L. Henderson

(57) ABSTRACT

Mono- or dipotassium salts of azo compounds conforming to the formula (I) or one of its tautomeric structures

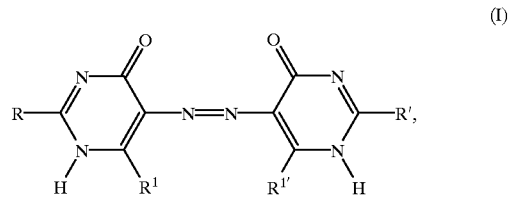

(I)

where
R and R' are independently OH, $NH_2$, NH—CN, acylamino or arylamino and
$R^1$ and $R^{1'}$ are independently —OH or —$NH_2$,
and also their hydrates.

19 Claims, No Drawings

MONO- AND DIPOTASSIUM SALTS OF AZO COMPOUNDS

The invention relates to the mono and dipotassium salts of azo compounds of the formula (I) and to their hydrates, processes for their preparation, their use for preparing metal complexes, substrates containing the thus obtainable metal complexes and potassium metal complexes which contain at least one guest compound.

The use of azobarbituric acid and its metal salts, especially those of polyvalent metals, as pigments is described in DE-A-2 064 093. A suitable method for preparing the salts of polyvalent metals is said to be the reaction of barbituric acid with an azo group transfer agent, for example benzenesulphonyl azide, in an alkaline medium by the method of Regnitz (Angewandte Chemie, 79, 786 (1967)) in the presence of appropriate metal salts or the reaction of azobarbituric acid with salts of polyvalent metals.

EP-A-297 397 utilizes azidoformamidinium salts as azo group transfer agents for preparing diazo compounds of α,γ-diketones, for example barbituric acid. It also describes the preparation of the corresponding azo compounds, for example azobarbituric acid, by coupling the thusly prepared diazobarbituric acid with barbituric acid in a sodium-alkaline medium.

EP-A-73 463 discloses intercalation compounds of the metal salts of azo derivatives of certain α,γ-diketones, including of barbituric acid, and their use as pigments. The method disclosed for preparing the azobarbituric acid comprises the reaction of barbituric acid with an azo group transfer agent in a neutral or alkaline medium by the Regnitz method (see above) with or without isolation of the diazobarbituric acid intermediate. However, the only azo group transfer agent used is sodium nitrite, so that the azobarbituric acid is obtained as sodium salt. The sodium azobarbiturate prepared by the syntheses described in the literature contains appreciable amounts of up to 15 mol % of unconverted diazobarbituric acid as included impurity. In the course of the subsequent reaction with other metal salts, especially with nickel salts (preparation of C.I. Pigment Yellow 150), and intercalation, the diazobarbituric acid likewise leads to unwanted byproducts, which lead to impure pigments.

It has now been found that, surprisingly, the mono- and dipotassium salts conforming to the formula (I) or one of its tautomeric structures

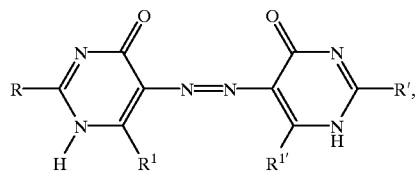

(I)

where

R and R' are independently OH, $NH_2$, NH—CN, acylamino or arylamino and $R^1$ and $R^{1'}$ are independently —OH or —$NH_2$, and also their hydrates do not have these disadvantages. The salts of the invention preferably contain only negligible quantities, if any, of diazobarbituric acid.

Aryl substituents in the formula (I) are preferably phenyl or naphthyl, which may each be substituted for example by halogen such as F, Cl, Br, —OH, $C_1$–$C_6$-alkyl, $C_1$–$C_6$-alkoxy, —$NH_2$, —$NO_2$ and —CN.

Acyl substituents in the formula (I) are preferably ($C_1$–$C_6$-alkyl)-carbonyl, phenylcarbonyl, $C_1$–$C_6$-alkylsulphonyl, phenylsulphonyl, optionally $C_1$–$C_6$-alkyl-, phenyl- and naphthyl-substituted carbamoyl, optionally $C_1$–$C_6$-alkyl-, phenyl- and naphthyl-substituted sulphamoyl or optionally $C_1$——$C_6$-alkyl-, phenyl-naphthyl-substituted guanyl, where the alkyl radicals mentioned may be substituted for example by halogen such as Cl, Br, F, —OH, —CN, —$NH_2$ or $C_1$–$C_6$-alkoxy and the phenyl and naphthyl radicals mentioned may be substituted for example by halogen such as F, Cl, Br, —OH, $C_1$–$C_6$-alkyl, $C_1$–$C_6$-alkoxy, —$NH_2$, —$NO_2$ and —CN.

Very particularly preferred potassium salts according to the invention are those of azo compounds of the formula (I) which in the form of their free acid conform to one of its tautomeric structures of the formula (II)

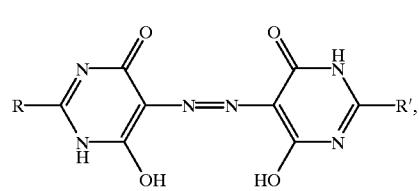

(II)

where

R and R' are independently OH and NHCN.

Preference is given here in particular to those novel potassium salts of azo compounds of the formula (II) which in the form of their free acid correspond to one of the tautomeric structures of the formulae (IIa to IIc)

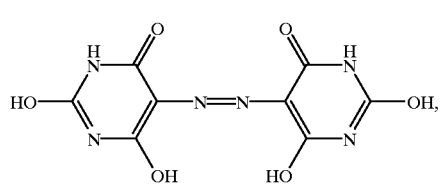

(IIa)

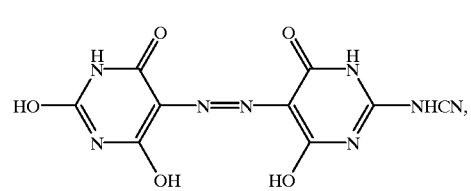

(IIb)

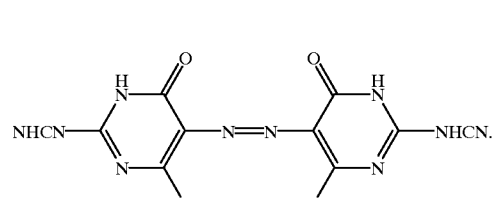

(IIc)

Particular preference is given to the mono- or dipotassium salt of the azobarbituric acid of the formula (IIa)

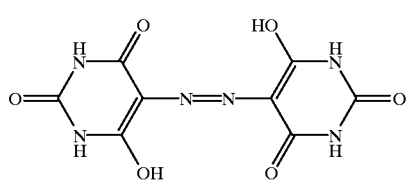

(IIa)

or its hydrates. These preferably contain only negligible amounts, if any, of diazobarbituric acid and thus do not have the above disadvantages.

It is likewise a surprise that the mono- and dipotassium salts of the formula (I), but especially the monopotassium salt of the azobarbituric acid of the formula (IIa), are also significantly more suitable for the synthesis of the corresponding metal complexes of azobarbituric acid and its intercalation compounds, for example C.I. Pigment Yellow 150,than the customarily employed sodium salt, since the process is much more rapid.

A further advantage of the mono- or dipotassium salts according to the invention is that the customary synthesis conditions will always provide reproducible product qualities, whereas this is not the case with the corresponding sodium salts. Since the quality of the reactants affects the quality of the resulting pigments as a result of reaction with the corresponding metal salts, the potassium salts according to the invention also directly affect the resulting pigments. The mono- or dipotassium salts according to the invention are therefore particularly advantageous, as compared with the sodium salts customarily used, for preparing the metal complexes of azo compounds, especially of azobarbituric acid and its intercalation compounds. The potassium salts of the invention may also be present as hydrates, that is to say they may host water of crystallization in their crystallized form. The monopotassium salts of the invention preferably contain approximately 0.5 to 1 mol equivalent of water of crystallization.

Particular preference is given to monopotassium salts of azobarbituric acid of the formula (IIa) as monohydrate.

The particularly preferred monohydrate detaches one mole equivalent of water of crystallization at 135° C.±10° C. when subjected to the conditions of differential scanning calorimetry (DSC) with a heating rate of 10 K/min.

The similarly preferred monohydrate of azobarbituric acid detaches one mole equivalent of water of crystallization at 230° C.±10° C. when subjected to the conditions of differential scanning calorimetry (DSC) with a heating rate of 10 K/min.

For simplicity, the monohydrate which loses its water of crystallization at about 135° C. will hereinafter be designated the α-form and the monohydrate which loses its water of crystallization at about 230° C. as the β-form. The X-ray diffraction spectra of the two hydrate forms do not differ.

The similarly preferred monopotassium salt of azobarbituric acid detaches 0.4 to 0.6, especially 0.5,mol equivalent of water of crystallization at 195° C. +10°C. when subjected to the conditions of DSC with a heating rate of 10 K/min.

The invention further provides a process for preparing the inventive mono- or dipotassium salts of the azo compounds of the formula (I), characterized in that the diazo compound of the formula (Va) or (Vb)

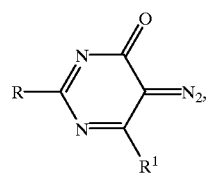

(Va)

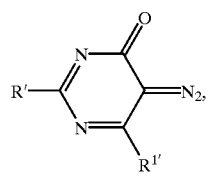

(Vb)

where R, $R^1$, R' and $R^{1'}$ are each as defined above, in the form of its free acid is coupled in the presence of alkaline potassium salts with barbituric acid or its derivatives of the formula (IVa) and/or (IVb)

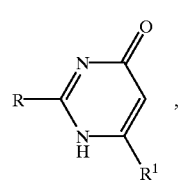

(IVa)

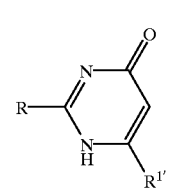

(IVb)

In a particularly preferred embodiment, the diazobarbituric acid compound of the formula (Va) or (Vb) is obtained by converting its sodium salt to the acid at a pH of less than 1.5 and isolating the acid.

The invention further provides a process for preparing the inventive mono- or dipotassium compounds, which is characterized in that barbituric acid derivatives of the formula (IVa) and/or (IVb)

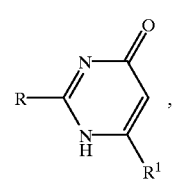

(IVa)

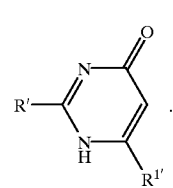

(IVb)

where R, R', $R^1$ and $R^{1'}$ are each as defined above, are reacted with azo group transfer agents and the resulting diazobarbituric acid derivative is coupled onto barbituric acid compounds of the formula (IVa) or (IVb) in the presence of alkaline potassium compounds.

In a particularly preferred embodiment, the azo group transfer agent is prepared in the presence of potassium compounds, especially potassium nitrite, as sole alkali source.

The preferred alkaline potassium compound for either process is KOH, $K_2CO_3$ or potassium acetate.

Examples of preferred azo group transfer agents are reaction products of aminoguanidine bicarbonate with potassium nitrite, which is preferably used in the form of its aqueous solution.

Other possibilities are azido compounds of the formula (III)

where $R^3$ is an acyl radical such as —$CONH_2$, —CO—NH-alkyl, —$CON(alkyl)_2$, —$COOR_{11}$, $R_{12}$—$SO_2$- or a heterocyclic radical. $R_{11}$ is alkyl, aralkyl or aryl, $R_{12}$ is amino, alkyl, aralkyl, aryl or heterocyclyl. Alkyl for the purposes of the invention is straight-chain or branched-chain, substituted or unsubstituted alkyl of preferably 1 to 12 carbon atoms, especially of 1 to 6 carbon atoms. The amino groups may be substituted in any desired manner.

Examples of azides useful for the synthesis are carbamoyl azide, methyl azido-formate, ethyl azidoformate, dimethylaminosulphonyl azide, methylsulphonyl azide, benzylsulphonyl azide, benzenesulphonyl azide, o-toluenesulphonyl azide, m-toluenesulphonyl azide, p-toluenesulphonyl azide, 3—nitrobenzenesulphonyl azide, 2-chlorobenzenesulphonyl azide, 4-chlorobenzenesulphonyl azide and 2-azido-3-ethylbenzothiazolium tetrafluoroborate.

Preferably, the monopotassium compounds can be isolated at a pH of 3 to 7 and the dipotassium compounds at a pH of 6 to 9.

The inventive monopotassium salts of the compounds of the formula (I) are incidentally obtained with preferably 0.5 to 1 mol equivalent of water of crystallization according to either of the abovementioned methods of synthesis. If the monopotassium salt hydrates are to be dried, the drying of their aqueous salt solution or suspension is preferably carried out at low temperatures, especially at a temperature of 20 to 60° C., especially 40° C., at which the water of crystallization is not given up.

The invention therefore also provides a process for preparing the inventive monohydrate in the α-form, which is characterized in that diazobarbituric acid in the form of its free acid is coupled with barbituric acid in the presence of alkaline potassium compounds and if desired the product subsequently isolated.

Treating the α-form obtained by this process, for example at elevated temperatures under pressure, provides a further form of the potassium salt according to the invention (which corresponds to the above-characterized β-form), which likewise crystallizes with one molecule of water of crystallization.

The invention therefore also provides a process for preparing the monohydrate in the β-form, which is characterized in that the monohydrate in the α-form is heat-treated at a temperature of 140 to 160° C. in an autoclave at a pH of 2 to 6,especially at 3 to 4.

The two forms, α and β, also behave differently in the subsequent reaction with appropriate metal salts to form the metal complexes of azobarbituric acid and intercalation compounds thereof. This may be seen for example from the synthesis of C.I. Pigment Yellow 150 (see Examples 10 and 11). For instance, the use of the α-form in the preparation of the corresponding nickel metal complex will provide a pigment which, after dispersing, leads to greenish yellow hues of high colour strength, whereas a corresponding pigment prepared from the β-form of the monohydrate leads to particularly more reddish yellows of lower colour strength. Of industrial significance is the advantage of the reproducibility of these results; also, the reaction to form the metal complexes is faster than with the corresponding sodium salts. This is incidentally true of all mono- and dipotassium salts of the formula (I).

The present invention further provides a process for preparing metal complexes where the metal is selected from the group consisting of Ca, Zn, Cu, Fe, Cd, Sr, Ba, Cr, Sn, Al, Mg, Pd, La and Ni, which is characterized in that mono- or dipotassium salts of the invention are reacted with metal salts from the abovementioned group, preferably at pH <7,and if desired the resulting metal complex is reacted with a compound to be hosted, preferably at a pH of 1 to 7.

The mono- and dipotassium salts of the invention are preferably used in the form of their aqueous suspensions, preferably as aqueous presscakes.

In general, the metal complex compound forms a layered crystal lattice in which the bonding within a layer is essentially via hydrogen bonds and/or metal ions. Preferably, the metal complex compounds are metal compounds which form a crystal lattice which consists of essentially planar layers.

The metal complexes hosting other, guest compounds can be present in the form of inclusion compounds, intercalation compounds and also as solid solutions.

Useful metal complexes also include metal complexes in which a different metal-containing compound, for example a salt or metal complex, is incorporated into the crystal lattice of the metal complex. In this case, in the metal complex, a portion of the metal may be replaced by other metal ions, or further metal ions can enter into a more or less pronounced interaction with the metal complex.

Included compounds may be organic compounds and inorganic compounds. Compounds which can be included come from a very wide variety of classes of compounds. For purely practical reasons, preference is given to such compounds as are liquid or solid under normal conditions (25° C., 1 bar).

Of the liquid substances, preference is given in turn to those which have a boiling point (1 bar) of 100° C. or higher, preferably of 150° C. and higher. Suitable compounds are preferably acyclic and cyclic organic compounds, for example aliphatic and aromatic hydrocarbons, which may be substituted, for example by OH, COOH, $NH_2$, substituted $NH_2$, $CONH_2$, substituted $CONH_2$, $SO_2NH_2$, substituted $SO_2NH_2$, $SO_3H$, halogen, $NO_2$, CN, —$SO_2$-alkyl, —$SO_2$-aryl, -O-alkyl, -O-aryl, -O-acyl.

Aryl substituents are preferably phenyl or naphthyl, which may each be substituted for example by halogen such as F, Cl, Br, —OH, $C_1$-$C_6$-alkyl, $C_1$-$C_6$-alkoxy, —$NH_2$, —$NO_2$ and —CN.

Alkyl substituents are preferably $C_1$—$C_6$-alkyl, which may be substituted for example by halogen, such as chlorine, bromine, fluorine, —OH, —CN, —$NH_2$ or $C_1$–$C_6$-alkoxy.

Cycloalkyl substituents are preferably $C_3$-$C_7$-cycloalkyl, especially $C_5$-$C_6$-cycloalkyl, which may be substituted for example by $C_1$-$C_6$-alkyl, $C_1$-$C_6$-alkoxy, halogen such as Cl, Br, F, $C_1C_6$-alkoxy, -OH, -CN and NH2.

Aralkyl substituents are preferably phenyl- or naphthyl-$C_1C_4$-alkyl, which may be substituted in the aromatic radicals by halogen such as F, Cl, Br, -OH, $C_1$-$C_6$-alkyl, $C_1$-$C_6$-alkoxy, -NH2, $NO_2$ and CN, for example.

Acyl substituents are preferably ($C_1$-$C_6$-alkyl)-carbonyl, phenylcarbonyl, $C_1$-$C_6$-alkylsulphonyl, phenylsulphonyl, optionally $C_1$-$C_6$-alkyl-, phenyl- and naphthyl-substituted carbamoyl, optionally $C_1$-$C_6$-alkyl-, phenyl- and naphthyl-substituted sulphamoyl or optionally $C_1$-$C_6$-alkyl-, phenyl- or naphthyl-substituted guanyl, where the alkyl radicals mentioned may be substituted for example by halogen such as Cl, Br, F, —OH, —CN, —$NH_2$ or $C_1$-$C_6$-alkoxy and the phenyl and naphthyl radicals mentioned may be substituted for example by halogen such as F, Cl, Br, —OH, $C_1$-$C_6$-alkyl, $C_1$-$C_6$-alkoxy, —$NH_2$, —$NO_2$ and —CN.

Specific examples are paraffins and paraffin oils; triisobutylene, tetraisobutylene, mixtures of aliphatic and aromatic hydrocarbons as produced in petroleum fractionation for example; chlorinated paraffin hydrocarbons such as dodecyl chloride or stearyl chloride; $C_{10}$-$C_{30}$-alcohols such as 1-decanol, 1-dodecanol, 1-hexadecanol, 1-octadecenol and their mixtures, olein alcohol, 1,12-octadecanediol, fatty acids and their salts and mixtures, for example formic acid, acetic acid, dodecanoic acid, hexadecanoic acid, octadecanoic acid, oleic acid, fatty acid esters, for example the methyl esters of $C_{10}$-$C_{20}$-fatty acids, fatty acid amides, such as stearamide, stearic acid monoethanolamide, stearic acid diethanolamide, stearonitrile, fatty amines, for example dodecylamine, cetylamine, hexadecylamine, octadecylamine and others; salts of fatty amines with sulphonic and carboxylic acids, isocyclic hydrocarbons such as cyclododecane, decahydronaphthalene, o-, m-, p-xylene, mesitylene, dodecylbenzene mixture, tetralin, naphthalene, 1-methylnaphthalene, 2-methylnaphthalene, biphenyl, diphenylmethane, acenaphthene, fluorene, anthracene, phenanthrene, m-, p-terphenyl, o-, p-dichlorobenzene, nitrobenzene, 1-chloronaphthalene, 2-chloronaphthalene, 1-nitronaphthalene, isocyclic alcohols and phenols and their derivatives such as benzyl alcohol, decahydro-2-naphthol, diphenyl ether, sulphones, for example diphenyl sulphone, methyl phenyl sutphone, 4,4'-bis-2-(hydroxyethoxy) diphenyl suophone;, isocyclic carboxylic acids and their derivatives such as benzoic acid, 3-nitrobenzoic acid, cinnamic acid, 1-naphthalenecarboxylic acid, phthalic acid, dibutyl phthalate, dioctyl phthalate, tetrachlorophthaolic acid, 2-nitrobenzamide, 3-nitrobenzamide, 4-nitrobenzamide, 4-chorobenzamide, suephonic acids, such as 2,5-dichloro-benzenesuiphonic acid, 3-nitro-, 4-nitroenzenesulphonic acid, 2,4-dimethyl-benzenesuiphonic acid, 1- and 2-naphthalenesulphonic acid, 5-nitro-1- and 5-nitro-2-naphthalenesulphonic acid, di-sec-butylnaphthalenesulphonic acid mixture, biphenyl-4-sulphonic acid, 1,4-, 1,5-, 2,6-, 2,7-naphthalenedisulphonic acid, 3-nitro-1,5naphthalenedisulphonic acid, 1-anthraquinonesulphonic acid, 2-anthraquinonesulphonic acid, biphenyl-4,4'-disulphonic acid, 1,3,6-naphthalenetrisulphonic acid and the salts of these suphonic acids e.g. the sodium, potassium, calcium, zinc, nickle and copper salts; sulphonamides such as benzenesulphonamide, 2-, 3- and 4-nitrobenzenesulphonamide, 2-, 3- and 4-chlorobenzenesulphonamide, 4-methoxy-benzenesulphonamide, 3,3'-sulphonylbisbenzenesulphonamide, 4,4'-oxybisbenzene-sulphonamide, 1 - and 2-naphthalenesuponamide.

Carboxamides and suiphonamides are a preferred group of compounds to be included, also suitable in particular are urea and substituted ureas such as phenylurea, dodecylurea and others and also their polycondensates with aldehydes, especially formaldehyde; heterocycles such as barbituric acid, benzimidazolone, 5-benzimidazolonesulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine and cyan uric acid.

Preferred metal complexes contain included surface-active compounds, especially surfactants, which are known for example from K. Lindner, Tenside-Textilhilfsmittel-Waschrohstoffe, $2^{nd}$ edition, Volume I, Wissenschaftliche Verlaosbesellschaft mbH, Stuttgart, 1964.They can be anionic, non-ionic or cationic compounds or ampholytes. Examples of suitable anionic compounds are true soaps, salts of aminocarboxylic acids, salts of lower or higher acylated aminocarboxylic acids, fatty acid subphates, sulphates of fatty acid esters, amides etc., primary alkyl sulphates, sulphates of oxo alcohols, secondary alkyl sulphates, suiphates of esterified or etherified polyoxy compounds, sulphates of substituted polyglycol ethers (sulphated ethylene oxide adducts), sulphates of acylated or alkylated alkanolamines, sulphonates of fatty acids, their esters, amides, etc., primary alkyl sulphonates, secondary alkyl sulphonates, alkyl sulphonates with acyls attached in ester fashion, alkyl or alkylphenyl ether sulphonates, sulphonates of polycarboxylic esters, alkylbenzenesulphonates, alkylnaphthalenesulphonates, fatty aromatic sulphonates, alkylbenzimidazolesulphonates, phosphates, polyphosphates, phosphonates, phosphinates, thiosulphates, hydrosulphites, sulphinates, persulphates. Examples of suitable non-ionic compounds are esters and ethers of polyalcohols, alkyl polyglycol ethers, acyl polyglycol ethers, alkylaryl polyglycol ethers, acylated and alkylated alkanolamine polyglycol ethers. Examples of suitable cationic compounds are alkylamine salts, quaternary ammonium salts, alkylpyridinium salts, simple and quaternary imidazoline salts, alkyldiamines and alkylpolyamines, acyldiamines and acylpolyamines, acylalkanolamines, alkanolamine esters, alkyl-$OCH_2$—N-pyridinium salts, alkyl-CO—NE—$CH_2$—N-pyridinium salts, alkylethyleneureas, sulphonium compounds, phosphonium compounds, arsenium compounds, alkylguanidines, acyl-biguanidides. Examples of suitable ampholytes are alkylbetaines, sulphobetaines and aminocarboxylic acids. Preference is given to using non-ionic surfactants, especially the ethylene oxide addition products of fatty alcohols, fatty amines and also of octyl- or nonylphenol.

A further important group of guest compounds are natural resins and resin acids such as for example abietic acid and its conversion products and salts. Examples of such conversion products are hydrogenated, dehydrogenated and disproportionated abietic acids. These can further be dimerized, polymerized or modified by addition of maleic anhydride and fumaric acid. Also of interest are the resin acids modified at the carboxyl group such as for example the methyl, hydroxyethyl, glycol, glyceryl and pentaerythritol esters and also resin acid nitriles and resin acid amines and also dehydroabietyl alcohol.

Also suitable for hosting are polymers, preferably water-soluble polymers, for example ethylene-propylene oxide block polymers, preferably having an $M_n$ not less than 1000,especially of 1000 to 10,000 g/mol, polyvinyl alcohol, poly(meth)-acrylic acids, modified cellulose, such as carboxymethylcelluloses, hydroxyethyl- and -propylcelluloses, methyl- and ethyl-hydroxyethylcelluloses.-

Other suitable guest compounds are condensation products based on
A) sulphonated aromatics,
B) aldehydes and/or ketones and optionally
C) one or more compounds selected from the group of the non-sulphonated aromatics, urea and urea derivatives.

"Based on" means that the condensation product was optionally prepared from other reactants besides A, B and optionally C. Preferably, however, the condensation products for the purposes of this invention are prepared only from A, B and optionally C.

The sulphonated aromatics of component A) will be understood in the context of this invention as including sulphomethylated aromatics as well. Preferred sulphonated aromatics are naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl or benzenesulphonic acids.

Aldehydes and/or ketones useful as component B) include in particular aliphatic, cycloaliphatic and also aromatic ones. Preference is given to aliphatic aldehydes, particularly preferably formaldehyde and other aliphatic aldehydes of 3 to 5 carbon atoms.

Examples of non-sulphonated aromatics useful as component C) are phenol, cresol, 4,4'-dihydroxydiphenyl sulphone and dihydroxydiphenylmethane.

Examples of urea derivatives are dimethylolurea, alkylureas, melamine and guanidine.

Preference is given to a condensation product based on
A) at least one sulphonated aromatic selected from the group consisting of naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids,
B) formaldehyde and optionally
C) one or more compounds selected from the group consisting of phenol, cresol, 4,4'-dihydroxydiphenyl sulphone, dihydroxydiphenylmethane, urea, dimethylolurea, melamine and guanidine.

Preferred condensation products are condensation products based on 4,4'-dihydroxydiphenyl sulphone, sulphonated ditolyl ether and formaldehyde; 4,4'-dihydroxydiphenyl sulphone, phenolsulphonic acid and formaldehyde; 4,4'-dihydroxydiphenyl sulphone, sodium bisulphite, formaldehyde and urea; naphthalenesulphonic acid, 4,4'-dihydroxydiphenyl sulphone and formaldehyde; sulphonated terphenyl and formaldehyde; and/or sulphonated 2-hydroxybiphenyl and formaldehyde and also naphthalenesulphonic acid and formaldehyde.

Particular preference for use as guest compounds is given to melamine or melamine derivatives, especially those of the formula (IV)

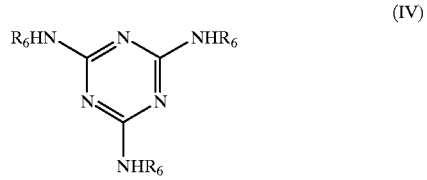

where $R_6$ is hydrogen or $C_1$-$C_4$-alkyl, which is optionally substituted by OH groups, very particularly preferably where $R_6$ is hydrogen.

The amount of substance which can be incorporated as guest compounds in the crystal lattice of the metal complex is generally 5% to 200% by weight, based on the amount of host compound. Preference is given to a guest compound amount of 10 to 100% by weight. The amount referred to here is the amount of substance which can not be washed out by suitable solvents and which is obtained from the elemental analysis. Naturally, it is also possible to add more or less than the aforementioned amount of substance, and it may be optionally dispensed with to wash an excess out. Preference is given to amounts of 10 to 150% by weight.

Inclusion compounds, intercalation compounds and solid solutions of metal complexes per se are known from the literature. They and their preparation are described for example in EP 0 074 515 and EP 0 073 463.

A preferred embodiment of the process of the invention for preparing the metal complexes is characterized in that, following the reaction with the guest compound, the pH is raised to 4.5 or higher, preferably to 4.5 to 7, if the reaction with the guest compound took place at a pH of less than 4.5.

The metal salt is preferably selected from water-soluble metal salts of the abovementioned metals, especially chlorides, bromides, acetates, nitrates, etc. Preferred metal salts have a water solubility of more than 20 g/l, especially more than 50 g/l, at 20° C.

Suitable metal salts for preparing the salts and complexes of the azo compounds are for example magnesium chloride, magnesium sulphate, calcium chloride, calcium acetate, calcium formate, barium chloride, barium nitrate, barium acetate, barium carbonate, strontium nitrate, manganese chloride, manganese sulphate, iron(III) chloride, iron(III) nitrate, iron(II) sulphate, cobalt chloride, cobalt nitrate, cobalt sulphate, aluminium sulphate, aluminium nitrate, chromium(III) sulphate, chromium(III) nitrate, zinc chloride, zinc sulphate, zinc acetate, cadmium chloride, cadmium sulphate, cadmium nitrate, copper(II) sulphate, copper(II) chloride, copper(II) acetate and copper(II) formate, lanthanum nitrate and aluminium chloride hydrate.

It is also possible to use mixtures of these salts, which may also contain various ones of the metals mentioned. The use of such salt mixtures is especially advisable to obtain intermediate hues for the coloured end products.

The invention further provides metal complexes obtainable by the above process. The invention further provides substrates, especially paper and plastics, which are dyed or pigmented with at least one of the above-described metal complexes.

The invention further provides potassium metal complexes of the inventive mono- or dipotassium salts of the azo compounds of the formula (I), especially (II), particularly preferably of the formula (IIa), which contain at least one guest compound.

Useful guest compounds include the abovementioned inorganic and preferably organic compounds.

The term "metal complexes" is herein also to be understood as meaning metal salts.

The invention further provides a process for preparing the potassium metal complexes of the invention, which is characterized in that the inventive mono- or dipotassium salts of the azo compound of the formula (I) are reacted with the guest compound, preferably at a pH of 1 to 7.

Particularly preferred guest compounds are cyclic or acyclic or organic compounds as already described above, especially melamine or melamine derivatives or polycondensates, preferably those based on urea and formaldehyde and also ethylene oxide-propylene oxide block copolymers.

The potassium metal complexes of the invention which contain another, guest compound are very useful for all pigment applications. They are useful for example for pigmenting varnishes of all kinds for the production of printing colours, distemper colours or binder colours, for the mass coloration of synthetic, semisynthetic or natural macromolecular substances, especially polyvinyl chloride, polystyrene, polyamide, polyethylene or polypropylene. They are also useful for the spin-dyeing of natural, regenerated or artificial fibres, for example cellulose, polyester, polycarbonate, polyacrylonitrile or polyamide fibres, and also for printing textiles and paper. These pigments provide finely divided, stable, aqueous pigmentations of emulsion and paint colours which are useful for paper coloration, for the pigment printing of textiles, for laminating and also for the spin-dyeing of viscose, by grinding or kneading in the presence of non-ionic, anionic or cationic surfactants.

EXAMPLES

Example 1

α-Form of Azobarbituric Acid Monopotassium Salt×1 $H_2O$ 136 g of aminoguanidine bicarbonate are introduced into 810 g of distilled water and dissolved therein with 280 g of hydrochloric acid (30% strength). The solution is then cooled down to about −10° C. with 780 g of ice and subsequently admixed with 232 g of 37% strength potassium nitrite solution in water to about 15° C. This is followed by 15 min of stirring at about 15° C., after which 2.0 g of amidosulphuric acid is added. This is followed by the addition of 269 g of barbituric acid, heating to 55° C. and stirring for 2 hours. The mixture is then adjusted to pH 2.5 with aqueous potassium hydroxide solution and subsequently stirred for 30 minutes. The mixture is then adjusted to pH 4.8 with aqueous potassium hydroxide solution and subsequently stirred for 30 min. The batch is then heated to 80° C. and subsequently stirred at pH 4.8 for 3 h. This is followed by suction filtration, washing until electrolyte-free, drying at 40° C. in a through-circulation cabinet and grinding to obtain 334 g of a reddish orange powder.

| Calculation for monopotassium salt × 1 $H_2O$ | C 28.4 | H 2.1 | N 24.8 | K 11.6 |
|---|---|---|---|---|
| Found | C 27.8 | H 2.4 | N 24.3 | K 12.0 |

Differential scanning calorimetry (DSC) is a specific form of differential thermal analysis. The DSC analyses were measured on an instrument from Mettler in a DSC 20 oven. The samples were investigated in the crucible with triply perforated lid at a heating rate of 10 K/minute.

Under the conditions mentioned, the compound prepared according to the above method gives an endothermic signal at 135° C. (The 135° C. mentioned can vary by ±10° C. on account of the reproducibility limits of the DSC method.) From the differential thermal analysis it follows in conjunction with Fourier Transform IR analysis that one mole equivalent of water is given up at the temperature mentioned.

Example 2

αForm Azobarbituric Acid Monopotassium Salt×1 $H_2O$

Example 1 is repeated with potassium acetate solution instead of potassium hydroxide solution. The thusly obtained compound is isolated and dried as described in Example 1

According to DSC analysis, the compound is identical to that prepared in Example 1.

Example 3

αForm Azobarbituric Acid Monopotassium Salt×1 $H_2O$

Example 1 is repeated with potassium carbonate solution instead of potassium hydroxide solution. The thusly obtained compound is isolated and dried as described in Example 1.

According to DSC analysis, the compound is identical to that prepared in Example 1.

Example 4

αForm Azobarbituric Acid Monopotassium Salt×1 $H_2O$ 154 g of diazobarbituric acid and 131 g of barbituric acid are introduced into 1850 g of distilled water and the batch is then heated to 80° C. and subsequently stirred for 2 30 min. It is then adjusted to pH 4.8 with aqueous potassium hydroxide solution and subsequently stirred for 3 h. This is followed by suction filtration, washing until electrolyte-free, drying at 40° C. in a through-circulation cabinet and grinding to obtain 334 g of a reddish orange powder.

According to DSC analysis, the compound is identical to that prepared in Example 1.

| Calculation for monopotassium salt × 1 $H_2O$ | C 28.4 | H 2.1 | N 24.8 | K 11.6 |
|---|---|---|---|---|
| Found | C 27.5 | H 2.4 | N 24.3 | K 11.0 |

Example 5

αForm Azobarbituri Acid Monopotassium Salt×1 $H_2O$

Example 4 is repeated with potassium acetate solution instead of potassium hydroxide solution. The thusly obtained compound is isolated and dried as described in Example 1.

According to DSC analysis, the compound is identical to that prepared in Example 1.

Example 6

αForm Azobarbituri Acid Monopotassium Salt×1 $H_2O$

Example 4 is repeated with potassium carbonate solution instead of potassium hydroxide solution. The thusly obtained compound is isolated and dried as described in Example 1.

According to DSC analysis, the compound is identical to that prepared in Example 1.

Example 7

βForm Azobarbituric Acid Monopotassium Salt×1 H₂O 300 g of βform azobarbituric acid monopotassium salt ×1 H₂ prepared according to Example 1 are stirred with a laboratory stirrer into 2700 g of distilled water until homogeneous. Thereafter, the batch is adjusted to pH 3.0 with hydrochloric acid and subsequently stirred in an autoclave at 140° C. for 8 h. This is followed by cooling down to 80° C., suction filtration, washing until electrolyte-free, drying at 40° C. in a through-circulation cabinet and grinding to obtain 240 g of a reddish orange powder.

| | | | | | | | |
|---|---|---|---|---|---|---|---|
| Calculation for monopotassium salt × 1 H₂O | C 28.4 | H 2.1 | N 24.8 | K 11.6 |
| Found | C 28.4 | H 2.2 | N 24.8 | K 11.0 |

On DSC analysis, the compound prepared according to the above method gives an endothermic signal at 230° C. ±10°C. From the differential thermal analysis it follows in conjunction with Fourier Transform IR analysis that one mole equivalent of water is given up at the temperature mentioned.

Example 8

Azobarbituric Acid Monopotassium Salt×½H₂O

Example 1 is repeated, except that the drying is carried out at 120° C. in a vacuum drying cabinet, affording 316 g of a reddish orange powder.

| | | | | |
|---|---|---|---|---|
| Calculation for monopotassium salt × ½ H₂O | C 30.0 | H 1.6 | N 26.2 | K 12.2 |
| Found | C 29.2 | H 1.9 | N 25.0 | K 12.1 |

On DSC analysis, the compound prepared according to the above method gives an endothermic signal at 195° C. +−10° C. From the differential thermal analysis it follows in conjunction with Fourier Transform IR analysis that ½ mol equivalent of water is given up at the temperature mentioned.

Example 9 Azobarbituric Acid Monopotassium Salt×½ H₂O

Example 4 is repeated, except that the drying is carried out at 120° C. in a vacuum drying cabinet, affording 316 g of a reddish orange powder.

According to DSC analysis, the compound is identical to that prepared in Example 8.

| | | | | |
|---|---|---|---|---|
| Calculation for monopotassium salt × ½ H₂O | C 30.0 | H 1.6 | N 26.2 | K 12.2 |
| Found | C 29.2 | H 1.9 | N 25.3 | K 12.1 |

Example 10 Melamine-intercalated Ni Complex of Azobarbituric Acid 425 g of water-moist paste of the αform of azobarbituric acid monopotassium salt H₂O prepared according to Example 1 and having a solids content of 40%, corresponding to 170 g in the dry state, are homogeneously suspended in 5000 ml of distilled water using a laboratory stirrer, heated to 95° C., admixed with 126 g of melamine followed by 1060 g of aqueous 6.5% strength nickel chloride solution and subsequent stirring at 95° C. for 1.5 h. The pH is then adjusted to pH 5.5 with potassium hydroxide solution. This is followed by suction filtration, washing until electrolyte-free, drying at 80° C. in a vacuum drying cabinet and grinding to obtain 288 g of a greenish yellow powder.

The pigment powder thus obtained is evaluated in a white paint drawdown. To this end, the pigment is incorporated into an alkyd-melamine resin system in accordance with the directions of DIN 53 238 Part 31.

Colour locus: x=0.4350 y=0.4671 where $$x = \frac{X}{X+Y+Z} \qquad y = \frac{Y}{X+Y+Z}$$

where

X, Y and Z are tristimulus values.

(The standardized colour system is described in Bayer Farben Revue, Sonderheft 3/2 D, 1986; p. 12–14).

Example 11

Melamine-intercalated Ni Complex of Azobarbituric Acid

Example 10 is repeated using the water-moist paste of the β-form of the azobarbituric acid monopotassium salt xH₂O prepared in Example 7, affording 288 g of a yellowish powder.

The pigment powder thus obtained is evaluated in a white paint drawdown. To this end, the pigment is incorporated into an alkyd-melamine resin system in accordance with the directions of DIN 53 238 Part 31.

Colour locus: $x = 0.4406$  $y = 0.4624$

Colour strength: 71% of the colour strength of the pigment obtained in Example 10.

Example 12

Azobarbituric Acid Dipotassium Salt 154 g of diazobarbituric acid and 131 g of barbituric acid are introduced into 1850 g of distilled water and the batch is then heated to 80° C. and subsequently stirred for 30 min. It is then adjusted to pH 4.8 with aqueous potassium hydroxide solution and subsequently stirred for 3 h. The batch is subsequently adjusted to pH 10.0 with aqueous potassium hydroxide solution and subsequently stirred for 3 h. This is followed by a suction filtration, washing until electrolyte-free and drying at 120° C. in a vacuum drying cabinet to obtain 341 g of a reddish orange powder.

| | | | | |
|---|---|---|---|---|
| Calculated for dipotassium salt | C 26.7 | H 1.4 | N 23.4 | K 21.8 |
| Found | C 26.2 | H 1.6 | N 22.9 | K 21.0 |

Example 13

Cyaniminoazobarbituric Acid Monopotassium Salt× 1 H₂O

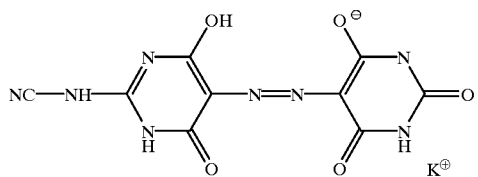

154 g of diazobarbituric acid and 131 g of cyaniminobarbituric acid are introduced into 1850 g of distilled water and the batch is then heated to 80° C. and subsequently stirred for 30 min. It is then adjusted to pH 5.0 with aqueous potassium hydroxide solution and subsequently stirred for 3 h. This is followed by a suction filtration, washing until electrolyte-free, drying at 120° C. in a through-circulation cabinet and grinding to obtain 310 g of a red powder.

Calculated for Monopotassium Salt×1 H₂O C,29.6; H,2.0; N,30.8; K,10.7;

Found C,29.6; H,2.1; N,30.8; K, 10.8.

Example 14

Dicyaniminoazobarbituric Acid Dipotassium Salt×1 H₂O

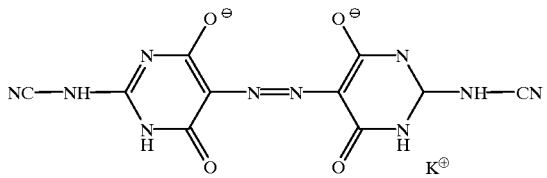

136 g of aminoguanidine bicarbonate are introduced into 810 g of distilled water and dissolved therein with 280 g of hydrochloric acid (30% strength). The solution is then cooled down to about −10° C. with 780 g of ice and subsequently admixed with 232 g of 37% strength potassium nitrite solution in water to about 15° C. This is followed by 15 min of stirring at about 15° C., after which 2.0 g of amidosulphuric acid is added. This is followed by the addition of 152 g of cyaniminobarbituric acid, heating to 65° C. and stirring for 4 hours. 152 g of cyaniminobarbituric acid are then added and the batch is subsequently adjusted to pH 8.0 with aqueous potassium hydroxide solution. The batch is then heated to 95° C. and subsequently stirred at pH 8.0 for 2 h. This is followed by suction filtration, washing until electrolyte-free, drying at 120° C. in a vacuum drying cabinet and grinding to obtain 395 g of a red powder.

| | | | | |
|---|---|---|---|---|
| Calculated for dipotassium salt × 1 H₂O | C 28.3 | H 1.5 | N 33.0 | K 18.4 |
| Found | C 28.3 | H 1.6 | N 33.0 | K 19.0 |

What is claimed is:

1. A monopotassium salt monohydrate of an azo compound conforming to formula (I) or a tautomeric form thereof

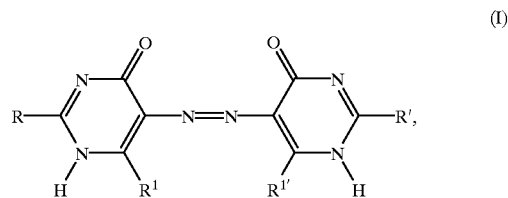

wherein

R and R' are independently OH, NH₂, NH—CN, acylamino, or arylamino, and

R¹ and R¹' are independently —OH or —NH₂.

2. A monopotassium salt monohydrate according to claim 1 conforming to formula (II) or a tautomeric form thereof

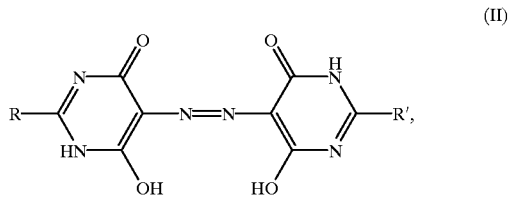

wherein R and R' are independently OH or NH—CN.

3. A monopotassium salt monohydrate according to claim 1 conforming to formula (IIa)

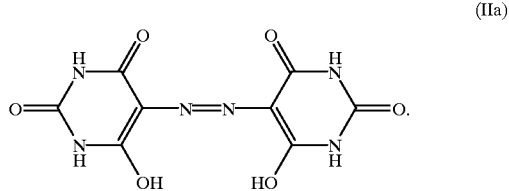

4. A monohydrate of the monopotassium salt according to claim 1 wherein one mole equivalent of water of crystallization is detached at a temperature of 135° C.±10° C. when subjected to the conditions of differential scanning calorimetry with a heating rate of 10 K/min.

5. A monohydrate of the monopotassium salt according to claim 1 wherein one mole equivalent of water of crystallization is detached at a temperature of 230° C.±10° C. when subjected to the conditions of differential scanning calorimetry with a heating rate of 10 K/min.

6. A hydrate of a monopotassium salt of an azo compound conforming to formula (I) or a tautomerc form thereof

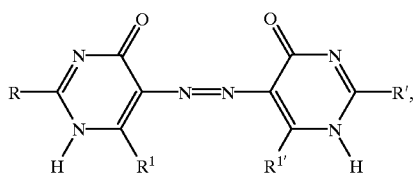
(I)

wherein
R and R' are independently OH, NH$_2$, NH—CN, acylamino, or arylamino, and
R$^1$ and R$^{1'}$ are independently —OH or —NH$_2$, having a degree of hydration such that 0.4 to 0.6 mol equivalent of water of crystallization is detached at a temperature of 195° C.±10° C. when subjected to the conditions of differential scanning calorimetry with a heating rate of 10 K/min.

7. A process for preparing a monopotassium salt monohydrate according to claim 1 comprising coupling
(a) the free acid form of a diazo compound of formula (Va) or (Vb)

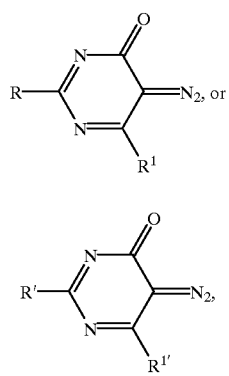
(Va)

(Vb)

wherein
R and R' are independently OH, NH$_2$, NH—CN, acylamino, or arylamino, and
R$^1$ and R$^{1'}$ are independently —OH or —NH$_2$, with
(b) barbituric acid or a derivative thereof of the formula (IVa) and/or (IVb)

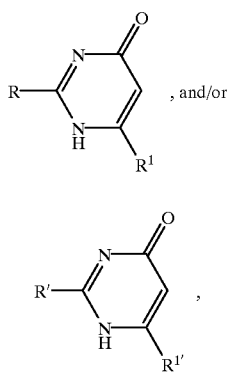
(IVa)

(IVb)

wherein R, R', R$^1$, and R$^{1'}$ are defined as above, in the presence of an alkaline potassium salt, and isolating the monopotassium salt monohydrate at a pH of 3 to 7.

8. A process for preparing a monopotassium or dipotassium salt of an azo compound conforming to formula (I) or a tautomeric form thereof

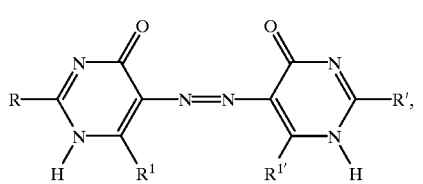
(I)

wherein
R and R' are independently OH, NH$_2$, NH—CN, acylamino, or arylamino, and
R$^1$ and R$^{1'}$ are independently —OH or —NH$_2$, or a hydrate thereof, comprising
(1) preparing the free acid form of a diazo compound of formula (Va) or (Vb)

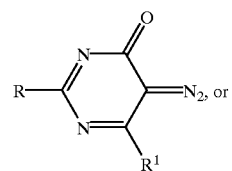
(Va)

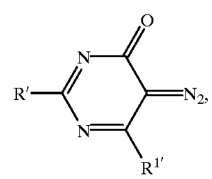
(Vb)

wherein
R and R' are independently OH, NH$_2$, NH—CN, acylamino, or arylamino, and
R$^1$ and R$^{1'}$ are independently —OH or —NH$_2$, by converting a corresponding sodium salt to the free acid form at a pH of less than 1.5 and isolating the free acid form, and
(2) coupling the free acid form of the diazo compound with barbituric acid or a derivative thereof of the formula (IVa) and/or (IVb)

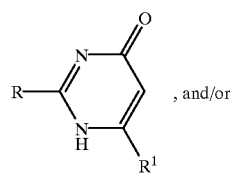
(IVa)

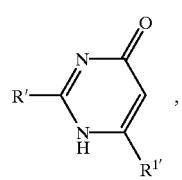
(IVb)

wherein R, R', R$^1$, and R$^{1'}$ are defined as above, in the presence of an alkaline potassium salt.

9. A process for preparing a monopotassium or dipotassium salt according to claim 1 comprising
(a) reacting barbituric acid or a derivative thereof of the formula (IVa) and/or (IVb)

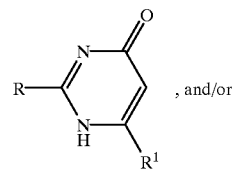
(IVa)

, and/or

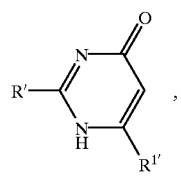
(IVb)

wherein
R and R' are independently OH, $NH_2$, NH—CN, acylamino, or arylamino, and
$R^1$ and $R^{1'}$ are independently —OH or —$NH_2$, with an azo transfer agent to form a diazobarbituric acid derivative, and
(b) coupling the diazobarbituric acid derivative with barbituric acid or a derivative thereof of the formula (IVa) or (IVb) in the presence of an alkaline potassium compound.

10. A process according to claim 9 wherein the azo group transfer agent is prepared in the presence of a potassium compound as sole alkali source.

11. A process according to claim 9 wherein the azo group transfer agent is prepared in the presence of potassium nitrite as sole alkali source.

12. A composition comprising
(a) a potassium metal complex of an azo compound conforming to formula (I) or a tautomeric form thereof

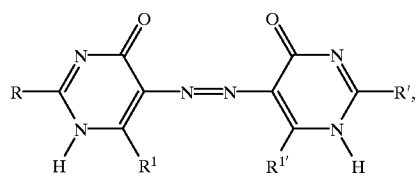
(I)

wherein
R and R' are independently OH, $NH_2$, NH—CN, acylamino, or arylamino, and
$R^1$ and $R^{1'}$ are independently —OH or —$NH_2$, or a hydrate thereof, and
(b) at least one guest compound.

13. A process for preparing a composition according to claim 2 comprising reacting
(a) a monopotassium or dipotassium salt of an azo compound conforming to formula (I) or a tautomeric form thereof

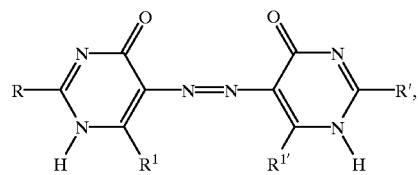
(I)

wherein
R and R' are independently OH, $NH_2$, NH—CN, acylamino, or arylamino, and
$R^1$ and $R^{1'}$ are independently —OH or —$NH_2$, or a hydrate thereof, with
(b) a guest compound.

14. A process for preparing a metal complex composition comprising
(a) reacting a monopotassium or dipotassium salt of an azo compound conforming to formula (I) or a tautomeric form thereof

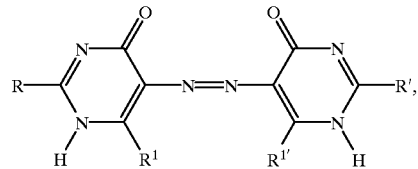
(I)

wherein
R and R' are independently OH, $NH_2$, NH—CN, acylamino, or arylamino, and $R^1$ and $R^{1'}$ are independently —OH or —$NH_2$, or a hydrate thereof, with
(b) a metal salt, wherein the metal is selected from the group consisting of Ca, Zn, Cu, Fe, Cd, Sr, Ba, Cr, Sn, Al, Mg, Pd, La, and Ni, at a pH<7, and
(c) optionally, a guest compound.

15. A composition prepared by the process of claim 14.

16. A substrate that is dyed or pigmented with at least one composition according to claim 12.

17. A substrate that is dyed or pigmented with at least one composition according to claim 15.

18. A process for preparing the monopotassium salt monohydrate according to claim 4 comprising coupling the free acid form of barbituric acid with barbituric acid in the presence of an alkaline potassium compound and optionally isolating the monohydrate.

19. A process for preparing a monopotassium salt monohydrate according to claim 1 that is characterized by the detachment of one mole equivalent of water of crystallization at a temperature of 230° C.±10° C. when subjected to the conditions of differential scanning calorimetry at a heating rate of 10 K/min comprising heating, at a temperature of 140 to 160° C. in an autoclave at a pH of 2 to 6, a monopotassium salt monohydrate according to claim 1 that is characterized by the detachment of one mole equivalent of water of crystallization at a temperature of 135° C.±10° C. when subjected to the conditions of differential scanning calorimetry at a heating rate of 10 K/min.

* * * * *